(12) United States Patent
Lorenz et al.

(10) Patent No.: US 8,996,230 B2
(45) Date of Patent: Mar. 31, 2015

(54) METHOD AND APPARATUS FOR TRANSLATING VEHICLE DIAGNOSTIC TROUBLE CODES

(71) Applicant: American Automobile Association, Inc., Heathrow, FL (US)

(72) Inventors: Frederick Lorenz, Longwood, FL (US); John Nielsen, Orlando, FL (US); Dwayne Shumate, Sorrento, FL (US)

(73) Assignee: American Automobile Association, Inc., Heathrow, FL (US)

( * ) Notice: Subject to any disclaimer, the term of this patent is extended or adjusted under 35 U.S.C. 154(b) by 0 days.

(21) Appl. No.: 13/737,301

(22) Filed: Jan. 9, 2013

(65) Prior Publication Data

US 2014/0195098 A1    Jul. 10, 2014

(51) Int. Cl.
*G07C 5/00* (2006.01)
*G05B 23/00* (2006.01)
*G06F 17/00* (2006.01)
*G07C 5/08* (2006.01)

(52) U.S. Cl.
CPC ............... *G06F 17/00* (2013.01); *G07C 5/008* (2013.01); *G07C 5/0808* (2013.01)
USPC ....................................... 701/29.1; 701/29.9

(58) Field of Classification Search
USPC ....................... 701/29.1–29.4, 31.4–31.9, 36; 702/182–185; 713/719
See application file for complete search history.

(56) References Cited

U.S. PATENT DOCUMENTS

| | | | |
|---|---|---|---|
| 6,028,537 A * | 2/2000 | Suman et al. ................. | 340/988 |
| 2002/0007237 A1* | 1/2002 | Phung et al. .................... | 701/33 |
| 2003/0069673 A1* | 4/2003 | Hong et al. ..................... | 701/29 |
| 2006/0101402 A1* | 5/2006 | Miller et al. .................. | 717/124 |
| 2009/0062978 A1* | 3/2009 | Picard ............................. | 701/29 |
| 2012/0136527 A1* | 5/2012 | McQuade et al. ........... | 701/29.4 |

* cited by examiner

*Primary Examiner* — Yonel Beaulieu
(74) *Attorney, Agent, or Firm* — Laubscher, Spendlove & Laubscher, P.C.

(57) ABSTRACT

A method and apparatus for translating diagnostic trouble codes which are generated in response to faults in the performance of motor vehicles are characterized by the use of a diagnostic code translator which receives diagnostic trouble codes and other information relating to the operating parameters of the vehicle at the time of a fault and analyzes the information to generate messages relating to the fault. The messages are transmitted to the vehicle driver so that corrective action may be taken.

15 Claims, 3 Drawing Sheets

METHOD AND APPARATUS FOR TRANSLATING VEHICLE DIAGNOSTIC TROUBLE CODES

BACKGROUND OF THE INVENTION

As motor vehicles become more sophisticated, the ability to detect faults in the operating condition of the motor vehicle has become more advanced. Motor vehicles currently use computer technology to control and monitor the performance of an engine. When a fault occurs in engine performance, a diagnostic trouble code is generated and an indication that a fault has occurred is provided to the driver, either via a short message or illumination of a "Check Engine" light on the vehicle dashboard. The driver of the vehicle then proceeds to a repair facility where a technician can access the vehicle computer and determine which diagnostic trouble code has been generated in order to determine what repairs are necessary to the vehicle. There are currently over 16,500 diagnostic trouble codes defined by the Society of Automotive Engineers (SAE). Some are generic codes and others are codes specific to particular automobile manufacturer.

A major drawback of current technology is that there is little ability for the owner or operator of the vehicle to determine either the severity of the fault or the corrective action that should be taken to remedy the fault.

The present invention was developed in order to provide a uniform translation of diagnostic trouble codes and provide a message to the vehicle operator in a form suitable for the operator to understand the nature and severity of the fault and take the appropriate action.

SUMMARY OF THE INVENTION

Accordingly, it is a primary object of the invention to provide a method and apparatus for translating vehicle diagnostic trouble codes when a fault in the operation of a vehicle occurs. Each vehicle is provided with a telematics device which is capable of communicating vehicle information to a remote server. The telematics device detects a diagnostic code which corresponds to a fault or condition to be considered in the operation of the motor vehicle. The code is transmitted by the telematics device to the server. The server identifies the vehicle and associates it with the detected code. The code is translated by a diagnostic code translator using proprietary software to produce a message which indicates the severity of the fault and provides information to remedy the fault, if needed. The message is then communicated to the owner or operator of the vehicle via e-mail, text message or telephone. Based on the information provided, the owner of the vehicle can request that a repair technician be dispatched to the vehicle.

The telematics device also transmits information which identifies the vehicle such as the vehicle identification number and information relating to operating parameters of the vehicle at the time a fault is detected. The operating parameters include vehicle speed, engine temperature, battery condition and vehicle mileage.

Vehicle history is stored in a database which retains a record of the diagnostic codes and repairs made to the vehicle. The database is capable of storing information from a plurality of vehicles, such as those that belong to members of a motor vehicle association. Data within the database is analyzed based on vehicle and model type, engine type and year to generate service intervals and predict repair costs for each vehicle type. In addition, the owner of the vehicle can access the database to obtain a vehicle history report.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
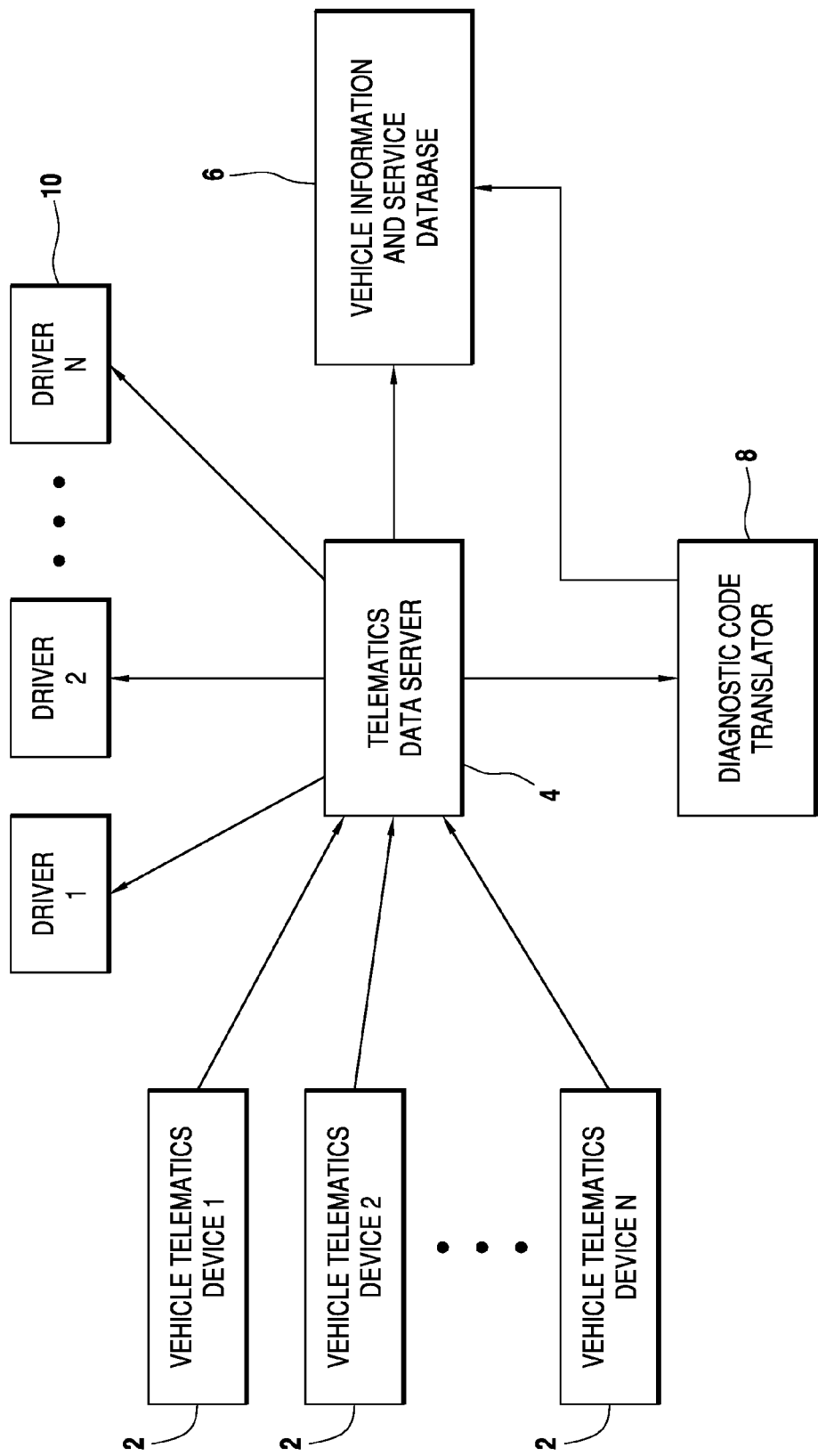
FIG. 1 is block diagram of the apparatus for diagnosing faults in a motor vehicle according to the invention.

Referring to FIG. 1, the vehicle diagnostic code translation system according to the invention will be described. A motor vehicle is provided with a telematics device 2. In the example shown, there are N vehicles, each with its own telematics device. The telematics device uses telecommunications to transmit information from the vehicle to a remote telematics data server 4. Alternatively, the information can be downloaded onto a personal computer or other storage device for later use. This information includes information which identifies the vehicle, such as the Vehicle Identification Number (VIN) and information relating to the operating condition or parameters of the vehicle. The operating parameters include vehicle speed, engine temperature, vehicle mileage, and battery condition. Other parameters may also be provided. For example, where the telematics device includes a global positioning sensor, information relating to the vehicle location may also be provided.

Of particular relevance to the invention is that the telematics device 2 in each vehicle can be connected with the on-board computer of the vehicle via an ODB port which monitors the vehicle for diagnostic trouble codes. These include generic codes defined by the SAE as well as codes that are specific to a particular automobile manufacturer. The codes are detected by the telematics device when a fault in the operation of the vehicle occurs. In addition, the telematics device can send an inquiry to the vehicle computer at scheduled intervals to check for diagnostic trouble codes generated by the computer.

The data server 4 receives vehicle identification, operation, and diagnostic code information transmitted from N telematics devices for N vehicles. The data is stored in a database 6. In addition, the data server transmits the vehicle identification information and diagnostic code information to a diagnostic code translator 8.

Table 1 illustrates the type of data gathered by the telematics server 4 and sent to the diagnostic code translator 8. Of course, as will be apparent to those of ordinary skill in the art, other types of data can be collected.

TABLE 1

| Parameter | Description | Required | Format |
|---|---|---|---|
| DeviceID | Unique identification associated with the telematics device and subscriber account. It is created by club or device vendor. | Y | 8 to 64 alphanumeric characters that may also contain dashes -, colons : and underscores _ |
| DTC | Diagnostic Trouble Code (DTC) to be translated. | Y | 5 alphanumeric characters |
| VIN | Vehicle identification number. (Note: VIN must be appended to the query using the telematics system subscriber database if it is not available real time through the OBD.) | Y | 17 alphanumeric characters, as defined by Title 49 of the US Code of Federal Regulations, Chapter V, Part 565.6 |
| Odometer | Odometer mileage when DTC was generated. | N | 1 to 6 numeric digits |
| Voltage | Battery voltage when DTC was generated. | N | Decimal number (XX.XX) |
| Speed | Vehicle speed when DTC was generated. | N | 1 to 3 numeric digits in miles per hour. |
| Temperature | Coolant temperature when DTC was generated. | N | Decimal number (XXX.XX or -XX) in degrees Fahrenheit. |

The diagnostic code translator 8 contains software to process the codes and vehicle operating parameters and translate them into consumer-ready messages and other technical data. These messages contain information relating to vehicle drivability, level of urgency in seeking further diagnostics and/or repair, and basic descriptions of the code and vehicle condition. The messages and other data interpreting the diagnostic code are transmitted to the telematics data server. The messages are transmitted to the driver 10 or owner of the vehicle by text message or e-mail, or by telephone via a call center. The technical data can be saved or transmitted to the database 6.

Table 2 represents examples of the various data provided by the diagnostic code translator to the telematics data server 4. Certain message information is tailored for transmission to vehicle owners and drivers, while other technical data is for use by repair facilities.

TABLE 2

| Data Element | Description | Sample |
|---|---|---|
| DTC | The OBDII code that was provided as input | P0305 |
| SAETable | SAE DTC table in which the DTC is defined | P03 |
| DTCName | The name assigned to the DTC | Cylinder 5 Misfire Detected |
| System | The vehicle system to which the DTC applies | Ignition |
| Category | The category in which the DTC is defined | Powertrain |
| GoRating | Likelihood of technician being able to resolve the problem at roadside (0-10, 10 being highest) | 9 |
| Priority | Relative priority of the DTC on a three point scale, with 1 equal to high and 3 equal to low priority | Normal |
| ERSTranslation | Translation of the DTC that is more appropriate for a roadside technician or repair facility | Ignition coils [IC] are controlled by the engine management computer. There is a problem with an IC control circuit. |
| ERSTechTip | Tip that can be provided to roadside technician to troubleshoot/resolve the problem | Check for damaged or loose ignition wires and/or fuel injector harness. |
| TextMessageIntro | Introductory message applicable for sending as part of a SMS text message | Your vehicle has reported a potential problem. |
| EmailIntro | Introductory message applicable for sending as part of an email message | System monitoring by AAA has reported a Diagnostic Trouble Code [DTC] from your vehicle. This code is defined below, along with recommendations on action you should take. |

TABLE 2-continued

| Data Element | Description | Sample |
|---|---|---|
| ConsumerText | The translation of the DTC into a consumer-friendly format | The diagnostic code is related to your vehicle's engine management system. |
| Impact | Consumer-friendly description of impact of DTC on vehicle | You may notice a loss of power or poor engine performance. |
| Recommendation | Five alternative, consumer-friendly recommendations regarding action to take | Continue to drive your vehicle, but only temporarily. Schedule a service appointment as soon as possible. |

Table 3 sets forth examples of messages that are sent to vehicle owners or drivers. Each recommendation is based on priority level and other factors specific to the diagnostic trouble code.

TABLE 3

| Interpretation | Corresponding "Recommendation" Response |
|---|---|
| Priority = 1 | (High priority) Immediately locate a safe place to pull over, park and turn off your vehicle. Imminent damage can occur from continuing to drive. |
| Both the nature of the DTC and a Priority of 2, 3 or 4 are considered. | (Normal priority) Continue to drive your vehicle, but only temporarily. Schedule a service appointment as soon as possible. (Normal priority) You may continue to drive your vehicle but there is a condition that needs attention. Schedule a service appointment as soon as it is convenient. (Low priority) You may continue to drive your vehicle without concern. The malfunction indicator lamp may be on but will turn off after sufficient drive cycles with no further problems. Monitoring continues and an alert will be sent if something changes. |
| The query submitted a DTC either generates "ISO/SAE Required" or is not in the generic code table | The diagnostic code was not recognized. You may continue to drive your vehicle but there is a condition that needs attention. Schedule a service appointment as soon as it is convenient. |

An important feature of the invention is that the diagnostic and operating information for a particular vehicle is continually updated in the database 6. In addition, information relating to repairs to the vehicle and messages relating to diagnostic code detections are also stored in the database. The information can also be sorted and compiled by vehicle make, model, engine, trim and year. Once sorted, the information is analyzed to define recommended service intervals for vehicles and to provide an indication of vehicle reliability and repair history. This information is particularly useful for prospective purchasers of used vehicles, insurance companies, vehicle manufacturers, and repair shops.

The vehicle fault diagnostic system according to the invention is particularly suitable to members of an organization such as an automobile club. The more members that participate and install telematics devices in their vehicles, the greater the information database established. This enables consistent analysis of diagnostic trouble codes for consistent interpretation and delivery of messages in response to the codes. Consistent, comprehensive diagnostic code translation within the organization also provides consistent instruction to repair facilities.

Figure 2:
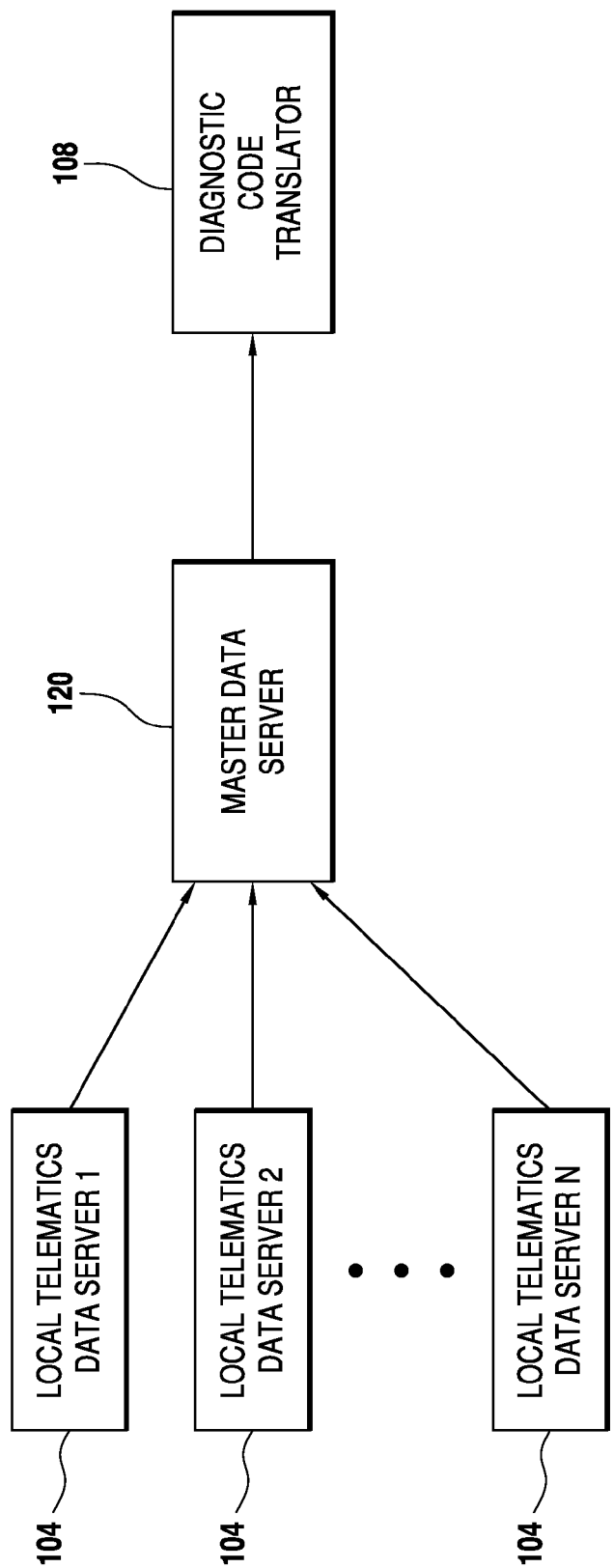
FIG. 2 is a block diagram of an alternate embodiment of the apparatus of FIG. 1.

Referring now to FIG. 2, an alternate embodiment of the invention will be described. The basic elements of the vehicle diagnostic system are similar to those of the embodiment of FIG. 1. However, in the embodiment of FIG. 2, a plurality of local telematics data servers 104 are provided. Each local server, which may be located in a particular geographic region, receives vehicle information and diagnostic code information from a plurality of the telematics devices (not shown) in the same manner as the system shown in FIG. 1. However, each local server telecommunicates with a national master data server 120. The master server 120 is connected with a master diagnostic code translator 108. Each local server 104 sends a query to the master server 120 via a secure network link to which only authorized local servers are connected. The master server logs the query based on the telematics device identification and forwards the query to the master diagnostic code translator 108. The master diagnostic code translator analyzes the query data to generate a message relating to vehicle drivability, level of urgency in seeking additional diagnostics or repair, and basic descriptions of the code and vehicle condition.

One benefit to the system illustrated in FIG. 1 is that the analysis of codes is consistent across all geographic boundaries. In addition, the accumulation of vehicle data from a greater number of sources affords more accurate analysis of vehicle characteristics, performance, and frequency of repair based on vehicle make, model, engine, and year. As diagnostic information is continually updated, the reliability of the analysis increases.

Figure 3:
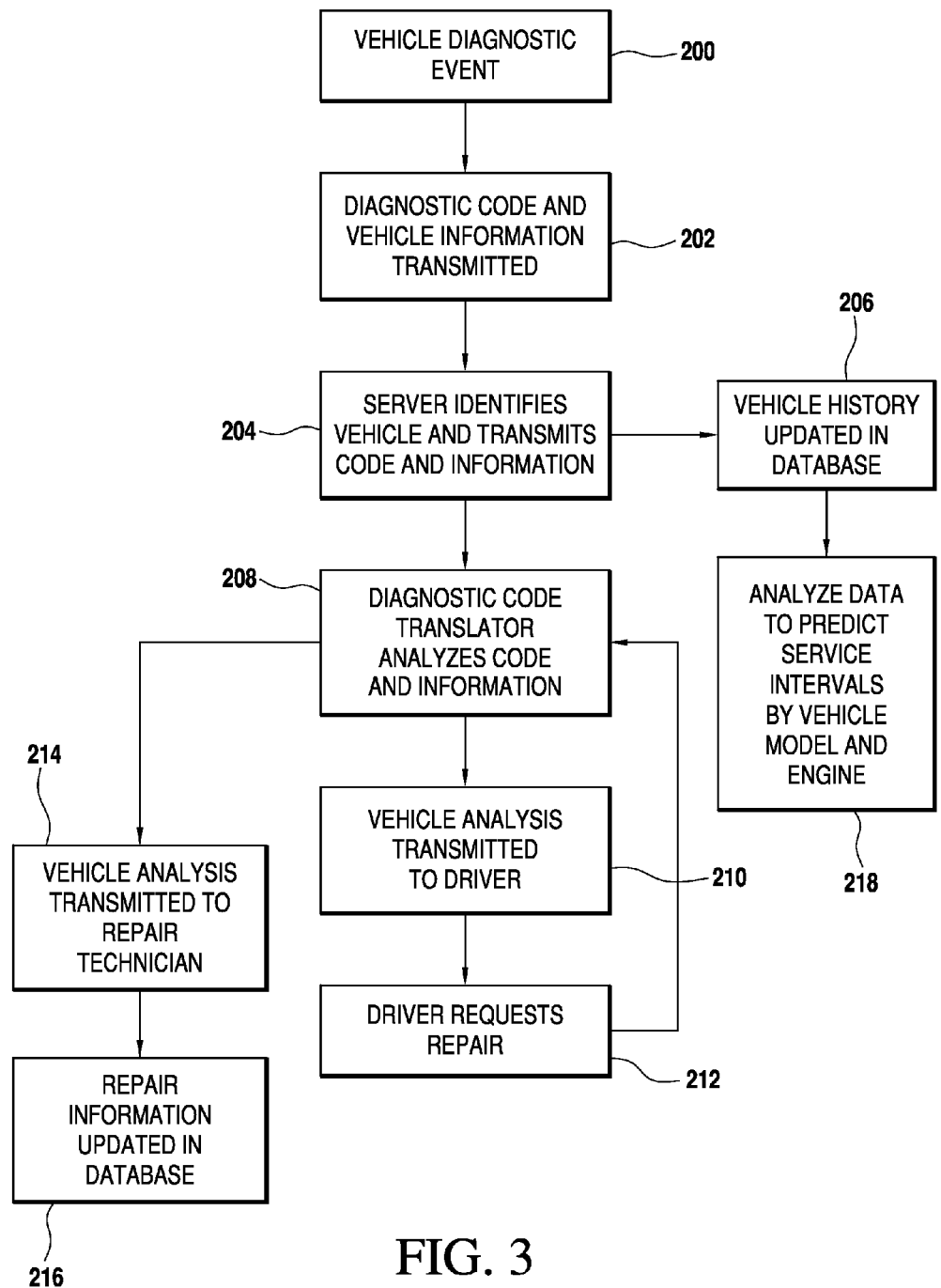
FIG. 3 is a flow chart illustrating the sequence of steps used in a method for diagnosing faults in a motor vehicle according to the invention.

The method for translating vehicle diagnostic trouble codes will be described in connection with FIG. 3. A fault in the operation of one of the vehicle's components such as the engine, transmission, electrical system, tires or the like is detected by the on-board computer which generates a diagnostic trouble code at step 200. The code is detected by a telematics device in the vehicle, either as the fault occurs or in response to a periodic inquiry from the telematics device to the computer. The code is transmitted by the telematics device to a server, together with information identifying the vehicle as well as information relating to other operating parameters of the vehicle at the time the fault occurred at step 202. The other parameters may include one or more of engine temperature, vehicle speed and mileage, and battery condition, or any other relevant information.

The server associates the transmitted code and vehicle information with a vehicle and transmits the code to a diagnostic translator and to a database at step 204. The database stores information relating to the performance history of the vehicle and updates the history for each vehicle as additional diagnostic codes for the vehicle are received by the server at step 206. The diagnostic translator analyzes the diagnostic codes and vehicle operating parameters and translates them into consumer-ready messages and other technical data at step 208. These messages contain information relating to vehicle drivability, level of urgency in seeking further diagnostics and/or repair, and basic descriptions of the code and vehicle condition. The messages are transmitted to the owner or driver of the vehicle at step 210. Messages can be in the form of text or e-mail messages or via a telephone call from a dispatcher. The messages can be delivered to the telematics device of the vehicle and/or to a cellular telephone of the driver and/or vehicle owner.

Based on the message, the driver can determine whether it is safe to continue to drive the vehicle or whether immediate action or repair to the vehicle is necessary. If immediate repair is necessary, the driver may request that a road service or tow vehicle be dispatched to the driver's vehicle location at step 212. The request can be made via the vehicle telematics device or via a telephone call. The road service request can be sent to a dispatcher who communicates with the emergency service provider to dispatch a tow truck or repair service provider to the vehicle. If the telematics device includes a global positioning device, the location of the vehicle needing repair is transmitted to the dispatcher. Alternatively, the driver of the vehicle can provide the dispatcher with the vehicle's location.

The dispatcher can also instruct the diagnostic code translator to send the message relating to the code to the repair technician at step 214, so that the technician will have an accurate diagnosis of the fault or trouble with the vehicle. If repairs are performed on the vehicle, a record of the repair is entered in the database at step 216 to update the vehicle history.

In a preferred embodiment of the invention, the data in the database is analyzed at step 218 to compile information broken down by vehicle make, model, engine type, trim and year so that service intervals and reliability statistics for the various vehicle models are obtained. This information is useful to prospective purchasers of used vehicles.

While the preferred forms and embodiments of the invention have been illustrated and described, it will be apparent to those of ordinary skill in the art that various changes and modifications may be made without deviating from the inventive concepts set forth above.

What is claimed is:

1. A method for translating diagnostic trouble codes from a motor vehicle, comprising the steps of
    (a) detecting a diagnostic trouble code which is generated by a computer connected with the vehicle corresponding to and in response to a fault in the performance of the motor vehicle;
    (b) automatically transmitting the detected diagnostic trouble code and vehicle identification information to a remote central server which identifies the vehicle and associates it with the detected diagnostic trouble code;
    (c) translating the detected diagnostic trouble code in a diagnostic code translator connected with the remote central server to produce a message which indicates the severity of the fault and includes at least one of the vehicle system in which the fault occurred, the level of urgency for seeking further diagnostics or repair, and recommendations regarding continued operation of the vehicle; and
    (d) automatically transmitting the message to the operator of the vehicle.

2. A method as defined in claim 1, wherein performance operating parameters of the vehicle at the time the diagnostic trouble code is detected are transmitted with the detected diagnostic trouble code to the central server.

3. A method as defined in claim 2, wherein the performance operating parameters include at least one of vehicle speed, engine temperature, battery condition, and odometer mileage.

4. A method as defined in claim 1, wherein the message is transmitted to the operator via one of e-mail, text messaging, and a telephone call.

5. A method as defined in claim 2, and further comprising the step of storing the fault and vehicle condition and repair information associated with the vehicle in a remote database.

6. A method as defined in claim 5, and further comprising the step of updating the stored fault and vehicle information in the remote database every time a fault is detected.

7. A method as defined in claim 6, and further comprising the step of analyzing detected diagnostic trouble codes and vehicle operating parameter information within the database to predict when vehicle fault and system failures will occur by year, make, model, and engine type for a variety of motor vehicles.

8. A method as defined in claim 5, wherein the operator of the vehicle can access the database to obtain the history of vehicle faults and conditions.

9. A method as defined in claim 1, and further comprising the step of requesting the dispatch of an emergency roadside technician to the vehicle in response to the code translation.

10. Apparatus for translating diagnostic trouble codes from motor vehicles, comprising
    (a) a telematics device connected with a motor vehicle for detecting a diagnostic trouble code which is generated by a computer connected with the vehicle in response to a fault in the performance of the vehicle and automatically transmitting the diagnostic trouble code and vehicle information;
    (b) a remote data server for receiving said diagnostic trouble code and vehicle information from said telematics device and generating a query containing said diagnostic trouble code and vehicle information;
    (c) a remote diagnostic code translator connected with said remote data server and which receives said query and translates the diagnostic trouble code to produce a message to the data server which indicates the severity of the fault and includes at least one of the vehicle system in which the fault occurred, the level of urgency for seeking further diagnostics or repair, and recommendations regarding continued operation of the vehicle;
    (d) a communication device connected with said data server for automatically transmitting the message to the operator of the vehicle.

11. Apparatus as defined in claim 10, wherein said telematics device transmits information which identifies the vehicle and information relating to operating parameters of the vehicle.

12. Apparatus as defined in claim 11, wherein said operating parameters include at least one of vehicle speed, engine temperature, battery condition, and odometer mileage.

13. Apparatus as defined in claim 10, where said communication device comprises a wireless device which is capable of transmitting e-mail, text message, and telephone calls to the operator.

14. Apparatus as defined in claim 12, and further comprising a remote database connected with said server which stores fault and vehicle condition and repair information associated with the vehicle.

15. Apparatus as defined in claim 14, wherein said data server receives diagnostic trouble codes from a plurality of telematics devices, each connected with a different motor vehicle, and further wherein said database stores diagnostic trouble code and vehicle operating parameter information for a plurality of vehicles and analyzes the stored diagnostic trouble code and vehicle operating parameter information to predict when vehicle fault and system failures will occur by year, make, model and engine type for a variety of motor vehicles.

\* \* \* \* \*